(12) United States Patent
Cosgrove et al.

(10) Patent No.: US 11,603,877 B1
(45) Date of Patent: Mar. 14, 2023

(54) DOWEL AND ASSOCIATED METHODS

(71) Applicants: Michael Cosgrove, Newtown, CT (US); Alfred E. Gratrix, Sr., Trumbull, CT (US); Mark Bracchi, Stratford, CT (US); Jerry Kozlowski, West Haven, CT (US); Alan Burr, Jr., Norwalk, CT (US)

(72) Inventors: Michael Cosgrove, Newtown, CT (US); Alfred E. Gratrix, Sr., Trumbull, CT (US); Mark Bracchi, Stratford, CT (US); Jerry Kozlowski, West Haven, CT (US); Alan Burr, Jr., Norwalk, CT (US)

( * ) Notice: Subject to any disclaimer, the term of this patent is extended or adjusted under 35 U.S.C. 154(b) by 385 days.

(21) Appl. No.: 16/867,783

(22) Filed: May 6, 2020

Related U.S. Application Data

(60) Provisional application No. 62/843,983, filed on May 6, 2019.

(51) Int. Cl.
*F16B 13/02* (2006.01)
*F16B 12/24* (2006.01)

(52) U.S. Cl.
CPC .............. *F16B 13/02* (2013.01); *F16B 12/24* (2013.01)

(58) Field of Classification Search
CPC .......... B29C 65/56; F16B 13/02; F16B 12/24; F16B 5/10; A47B 2230/0029; Y10T 403/55
USPC ....................................... 29/525.01; 403/292
See application file for complete search history.

(56) References Cited

U.S. PATENT DOCUMENTS

| | | | | |
|---|---|---|---|---|
| 1,989,018 A | * | 1/1935 | Norwood | F16B 19/02 439/84 |
| 2,001,144 A | * | 5/1935 | Krnansky | A63H 33/108 403/292 |
| 2,006,813 A | * | 7/1935 | Powers | F16B 13/02 439/444 |
| 3,059,291 A | * | 10/1962 | Sherwood | E06B 9/04 403/267 |
| 3,351,365 A | * | 11/1967 | Bickl | F16B 12/24 403/292 |
| 4,414,915 A | * | 11/1983 | Graybeal | B41F 15/0836 118/406 |
| 4,474,493 A | * | 10/1984 | Welch | A47B 13/003 403/388 |
| 5,088,180 A | * | 2/1992 | Nottingham | F16B 12/24 29/469 |

(Continued)

FOREIGN PATENT DOCUMENTS

WO    WO2017160152 A1    9/2017

*Primary Examiner* — Jose V Chen
(74) *Attorney, Agent, or Firm* — Ashkan Najafi

(57) ABSTRACT

A dowel includes a body having a composition of polystyrene and possible glass filling or other material compositions Such a body further has a chamber with an axial bore extended along an entire longitudinal length thereof. A first slot begins from a proximal end of the body and terminates at approximately a midpoint of the longitudinal length of the body. A second slot begins from a distal end of the body and terminates at approximately the midpoint of the longitudinal length of the body. The first and second linear slots are axially offset to improve chamber compression and a series of ridges outer surface is provided to improve connectivity between to objects.

13 Claims, 7 Drawing Sheets

(56) References Cited

U.S. PATENT DOCUMENTS

| | | | | |
|---|---|---|---|---|
| 5,106,310 | A * | 4/1992 | Krajewski | H05K 3/368 |
| | | | | 439/931 |
| 6,120,207 | A * | 9/2000 | Goto | F16B 11/006 |
| | | | | 403/268 |
| 6,254,301 | B1 * | 7/2001 | Hatch | F16B 19/004 |
| | | | | 411/908 |
| 6,267,527 | B1 * | 7/2001 | Miller | F16B 12/24 |
| | | | | 411/530 |
| 7,377,823 | B2 * | 5/2008 | Chen | H01R 12/585 |
| | | | | 439/82 |
| 9,431,733 | B1 * | 8/2016 | Heistand | H01R 12/585 |
| 2004/0099339 | A1 * | 5/2004 | Miller | F16B 11/008 |
| | | | | 144/353 |
| 2005/0100399 | A1 * | 5/2005 | Welch | F16B 12/04 |
| | | | | 403/292 |
| 2006/0228193 | A1 * | 10/2006 | Apsey | F16B 19/02 |
| | | | | 411/34 |
| 2014/0026456 | A1 * | 1/2014 | Pirayesh | A47G 1/10 |
| | | | | 40/781 |
| 2014/0075736 | A1 * | 3/2014 | Aeschlimann | F16B 13/061 |
| | | | | 29/525 |
| 2014/0079474 | A1 * | 3/2014 | Andreini | B32B 17/10743 |
| | | | | 403/292 |
| 2014/0144401 | A1 * | 5/2014 | Binder | F01L 1/047 |
| | | | | 29/888.1 |
| 2015/0147113 | A1 * | 5/2015 | Crabtree, II | A47B 13/021 |
| | | | | 403/292 |

* cited by examiner

DOWEL AND ASSOCIATED METHODS

CROSS REFERENCE TO RELATED APPLICATIONS

This is a non-provisional patent application that claims the benefit of U.S. provisional patent application No. 62/843,983 filed May 6, 2019, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to dowels and, more particularly, to a specially designed compressible dowel including a chemical composition of polystyrene and possible glass filling or other material compositions (i.e., NYLON™, polycarbonate, polypropylene or suitable material for the application, etc.), an axial bore, a pair of axially-offset linear slots, and design-specific ridges on the outer surface for providing improved connectivity between two objects.

Prior Art

In many construction industries, wooden objects are prepared by making a connection between two or more wooden parts (or panels), for example in the construction of houses, housing interiors and furniture. In making a connection, use is often made of a glue and/or a dowel. In this context, a dowel is commonly known as a peg that is present at the interface of two panels, wherein one end of the peg is present in a hole of one panel, and the other end in a hole of the other panel. A dowel serves as a guide to align the position of the two panels to each other.

In many applications, a dowel is equipped with a particular surface structure so as to enhance the friction of the dowel with the surface of the hole of a panel. It is for example known to provide the surface of a dowel with a groove along the dowel's circumference, or with some protrusions on its surface. A dowel is primarily used as an alignment means and secondly as a connection means, the friction that is achieved with such conventional surfaces may be sufficient. Also, in many instances it can be circumvented that the connection is truly challenged during production and/or use, e.g., it can be circumvented that a high force is applied that can pull the two panels apart.

The existing manufacturing process for assembling wooden doors, windows, cabinets, cabinet doors, furniture and musical instruments with wood dowels use a positional fit. Wood dowels are used to guide the wood sections together. The dowels do not support or hold the door sections together as a joiner. They only guide the door sections into the drill holes. The glue on the door material surfaces is what holds the door together. To begin the existing process, glue is distributed on all of the mating wood door surface sections. Once all the application of the glue to the door sections have been completed, glue is applied to the wood dowel sized for the drill hole. The dowel is then placed in the drill hole and then the door sections are all compressed together. Once the compression is completed, the door is then mechanically clamped together. The door is then sent out to be dried. Once the glue sections have dried, the clamps for the door are removed and the door is then sent to be cleaned by grit sanding to remove the excess glue from the door. This process requires many clamps and a time delay in getting the glue to dry before beginning the cleanup phase for excess glue removal. Also included is the time for labor expenses to get the wood door off the assembly line and then put back on. Also included is the cost of the extra clamps, floor storage place and gluing costs (e.g., cost of glue, labor time to apply glue to the wood dowel Conventional wood dowels cost more to manufacture because they must be accurately manufactured in order to provide the proper hold as well as locate the structural mating parts. Some wood dowels are made with spiral or straight grooves to allow the glue to escape from behind the dowel in the blind hole, known as hydraulic back pressure. Sometimes if the dowels have been sitting in an environment with exposure to excessive moisture, they can swell and if placed in a door (window, cabinet, furniture, etc.) panel, they may be oversized for the hole and not allow the glue to escape causing a hydraulic pressure problem. Then the door clamps will not be able to close, and this door must be removed. Also, this can happen if too much glue is applied to the dowel or drilled wood hole.

A conventional locational device for compression is a split roll pin. They are generally made out of metal. Usually a standard metal dowel placed in a drilled and reamed hole and other devices, such as screws are inserted into them in another hole for connecting purposes. Metal split roll pins are very expensive and to work correctly, need extreme precision. Using metal dowels or metal rods to join wood sections is not preferred.

A conventional fluted wood dowel is also a locational device. But wood dowels are not joiners, they are used for assembling wood parts. They are basically used for alignment purposes between sections of wood. They also require glue.

A conventional plastic dowel is disclosed in WO2017160152A1. One major difference is that this dowel uses diamond shaped ridges on the whole outer body of the dowel. Such diamond shaped ridges bind the dowel to the interior of the drilled wood hole. Unfortunately, this causes major damage to the wood hole surface and could cause a backup of wood particles being pushed into the hole and filling the compression slot which could cause a problem with the dowel reaching the full depth of the hole.

Accordingly, a need remains for specially designed compressible dowel in order to overcome at least one of the above-noted shortcomings. The exemplary embodiment(s) satisfy such a need by a specially designed compressible dowel including a chemical composition containing polystyrene and possible glass filling or other material compositions (i.e., NYLON™, polycarbonate, polypropylene or suitable material for the application), an axial bore, a pair of axially-offset linear slots, and design-specific raised elongated ridges on the outer surface that are convenient and easy to use. Lightweight yet durable in design, versatile in its applications, the designed-specific ridges are designed for providing improved connectivity between two objects.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a specially designed compressible dowel including a chemical composition of polystyrene and possible glass filling or other material compositions (i.e., NYLON™, polycarbonate, polypropylene or suitable material for the application, etc.), an axial bore, a pair of axially-offset linear slots, and design-specific ridges on the outer surface for providing improved connectivity between two objects. These and other objects, features, and advantages of the non-limiting exemplary embodiment(s) are provided by a dowel for locating two objects together. Such a dowel includes a body having a centrally registered longitudinal axis and including a hollow chamber having an axial bore extended along an entire longitudinal length of the centrally registered longitudinal axis, a first slot beginning from a proximal end of the body and terminating at approximately a midpoint of the longitudinal length of the body, and a second slot beginning from a distal end of the body and terminating at approximately the midpoint of the longitudinal length of the body. Advantageously, each of the first slot and the second slot are linear and extended along mutually exclusive and non-overlapping portions of the body.

In a non-limiting exemplary embodiment, the body has a collapsible outer diameter.

In a non-limiting exemplary embodiment, the first slot is approximately 180 degrees axially offset from the second slot.

In a non-limiting exemplary embodiment, the body further includes a plurality of linear ridges arranged in a juxtaposed linear pattern circumscribed about the outer surface and disposed adjacent to the midpoint of the longitudinal length of the body.

In a non-limiting exemplary embodiment, each of the proximal end and the distal end of the body has an outermost shoulder provided with a radius of curvature suitably sized and shaped for guiding the body initially in a drilled hole of an object.

In a non-limiting exemplary embodiment, the body includes a chemical composition including a polycarbonate.

In a non-limiting exemplary embodiment, the body includes a chemical composition including a polyethylene.

In a non-limiting exemplary embodiment, the body includes a chemical composition including 10% glass.

The present disclosure further includes a method of utilizing a dowel for locating two objects together, the method including the steps of: providing a body having a centrally registered longitudinal axis and including a hollow chamber having an axial bore extended along an entire longitudinal length of the centrally registered longitudinal axis, a first slot beginning from a proximal end of the body and terminating at approximately a midpoint of the longitudinal length of the body, and a second slot beginning from a distal end of the body and terminating at approximately the midpoint of the longitudinal length of the body, wherein each of the first slot and the second slot are linear and extended along mutually exclusive and non-overlapping portions of the body; providing a first object having a first hole; providing a second object having a second hole; without depositing glue into the first hole, inserting a first half of the body into the first hole; without depositing glue into the second hole, inserting a second half of the body into the second hole; and abutting the first object to the second object.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter, and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
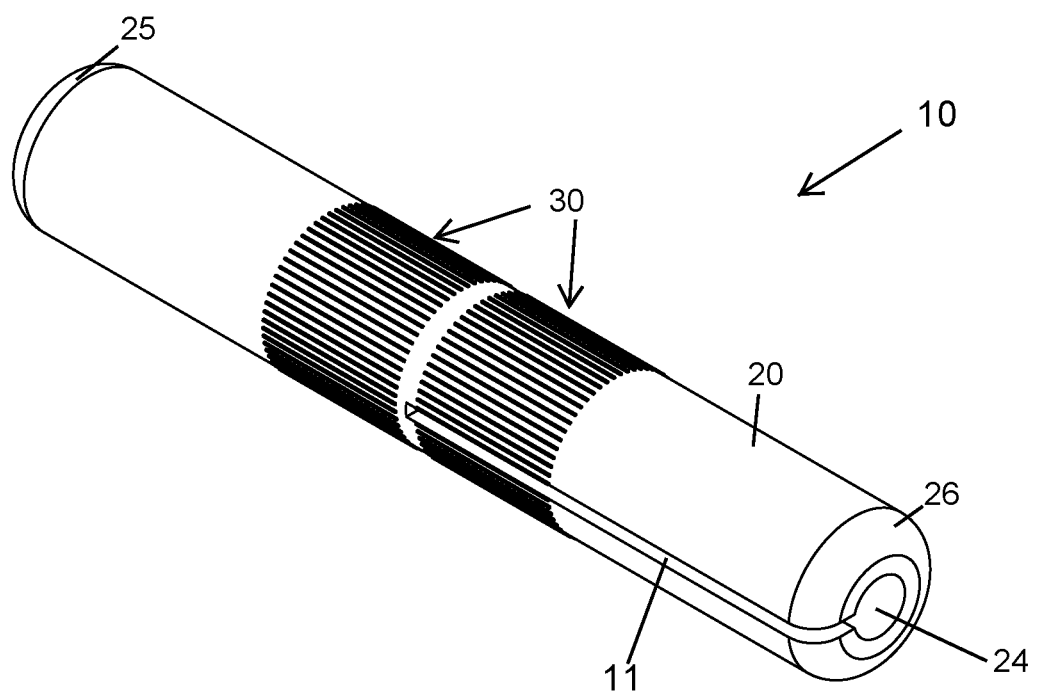
FIG. 1 is a compressible dowel, in accordance with a non-limiting exemplary embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or reflationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

The subject matter of the present disclosure may be commercialized under the name GBACK™ dowel, for example.

The terms "compression" and "compressible" are interchangeably used throughout the present disclosure. The terms "compression dowel," "compressible dowel," and "dowel" are interchangeably used throughout the present disclosure.

Figure 2:
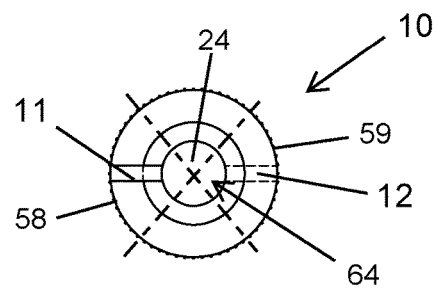
FIG. 2 is a left side elevational view of the compressible dowel shown in FIG. 1.
Figure 3:
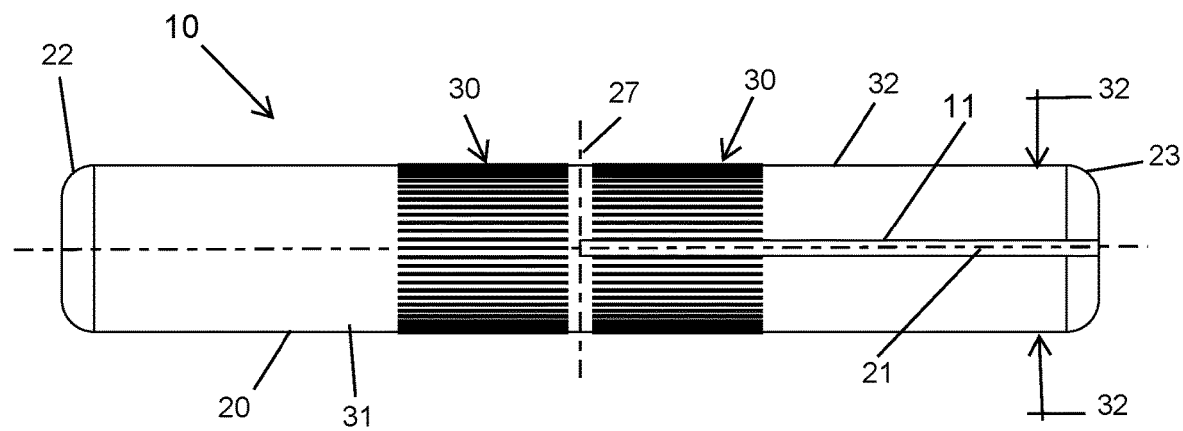
FIG. 3 is a front elevational view of the compressible dowel shown in FIG. 1.
Figure 4:
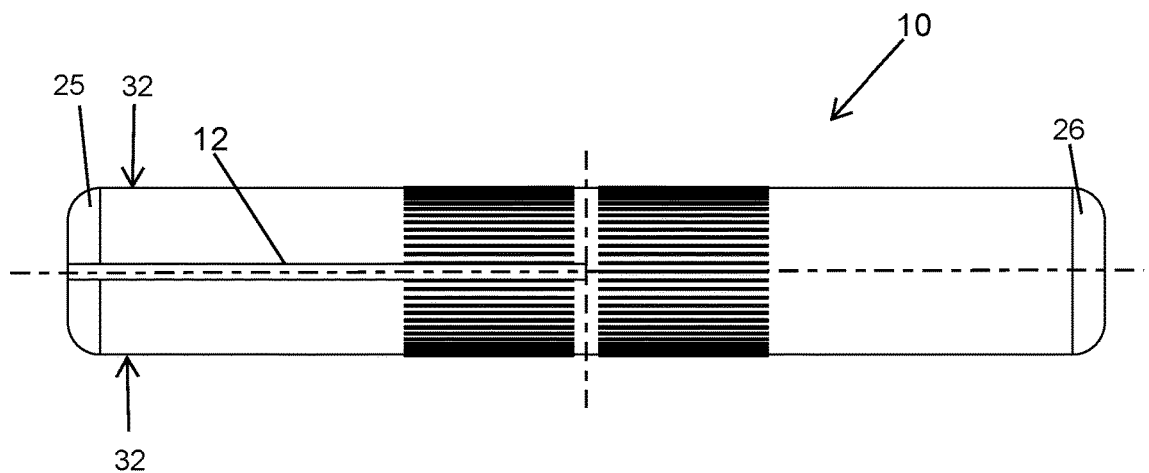
FIG. 4 is a rear elevational view of the compressible dowel shown in FIG. 1.
Figure 5:
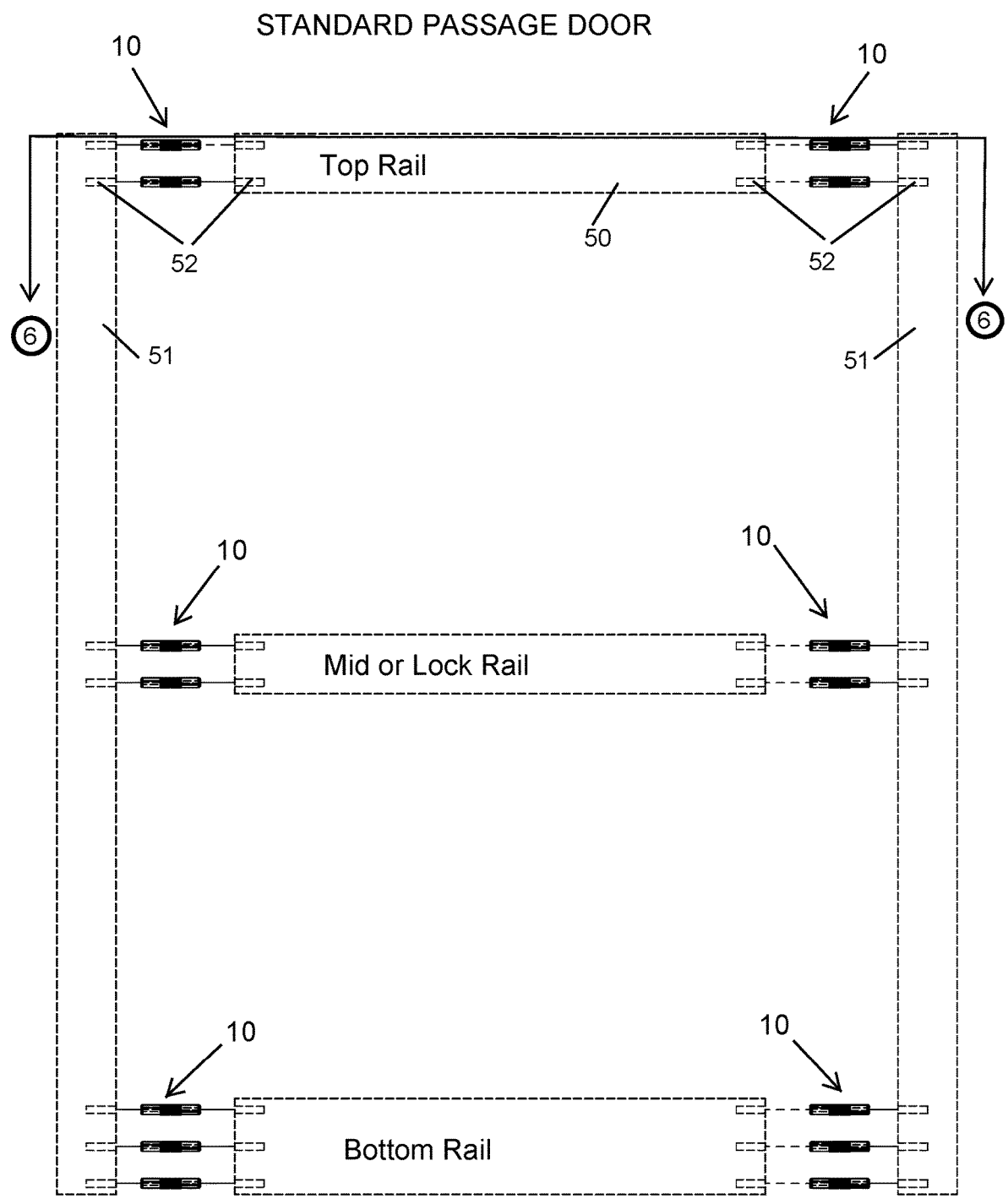
FIG. 5 is an environmental view showing the compressible dowel employed with a standard passage door, in accordance with a non-limiting exemplary embodiment of the present disclosure.
Figures 6, 6A:
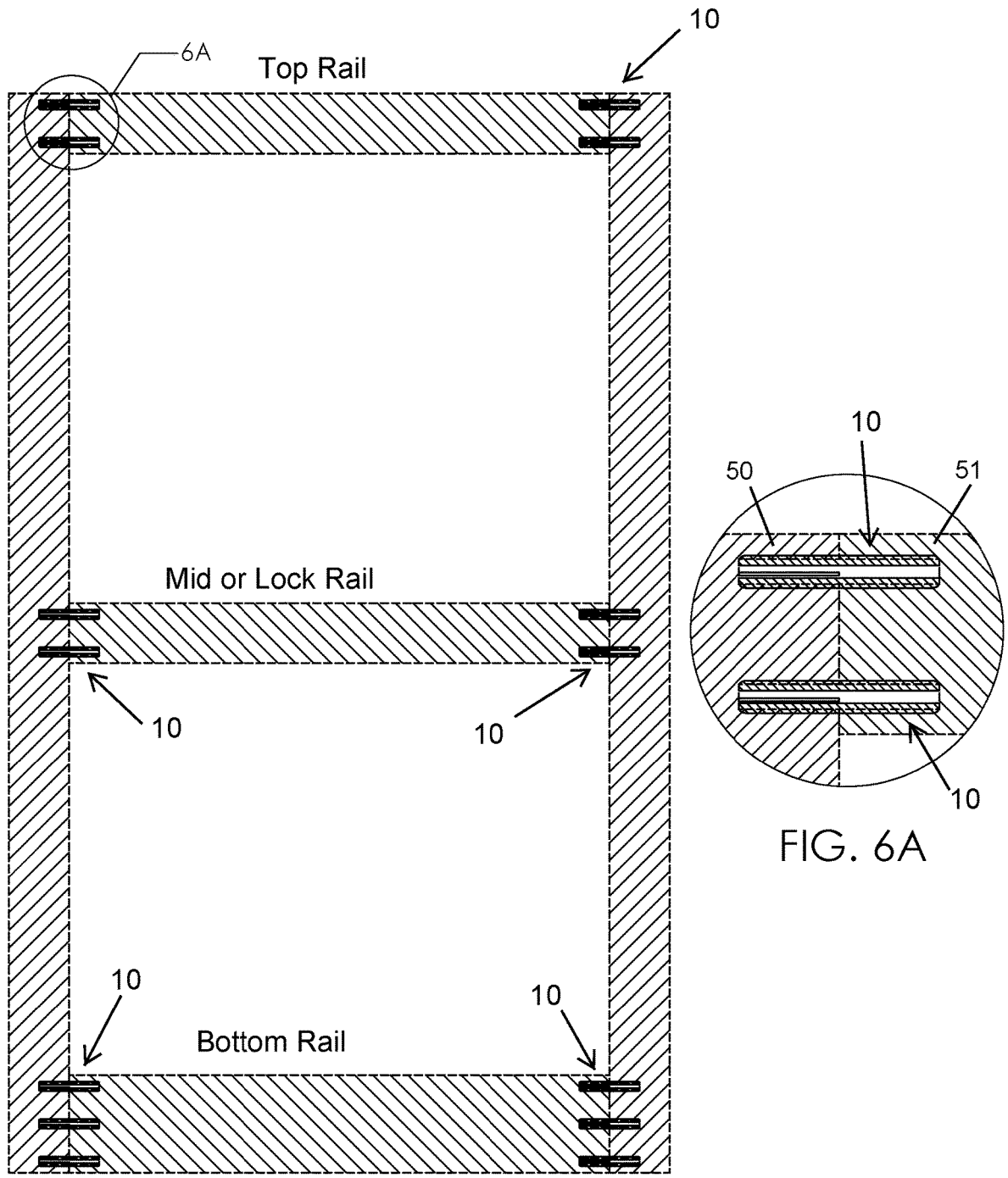
FIG. 6 is a cross-sectional view taken along line 6-6 shown in FIG. 5.
FIG. 6A is an enlarged view of section 6A taken in FIG. 6.
Figure 7:
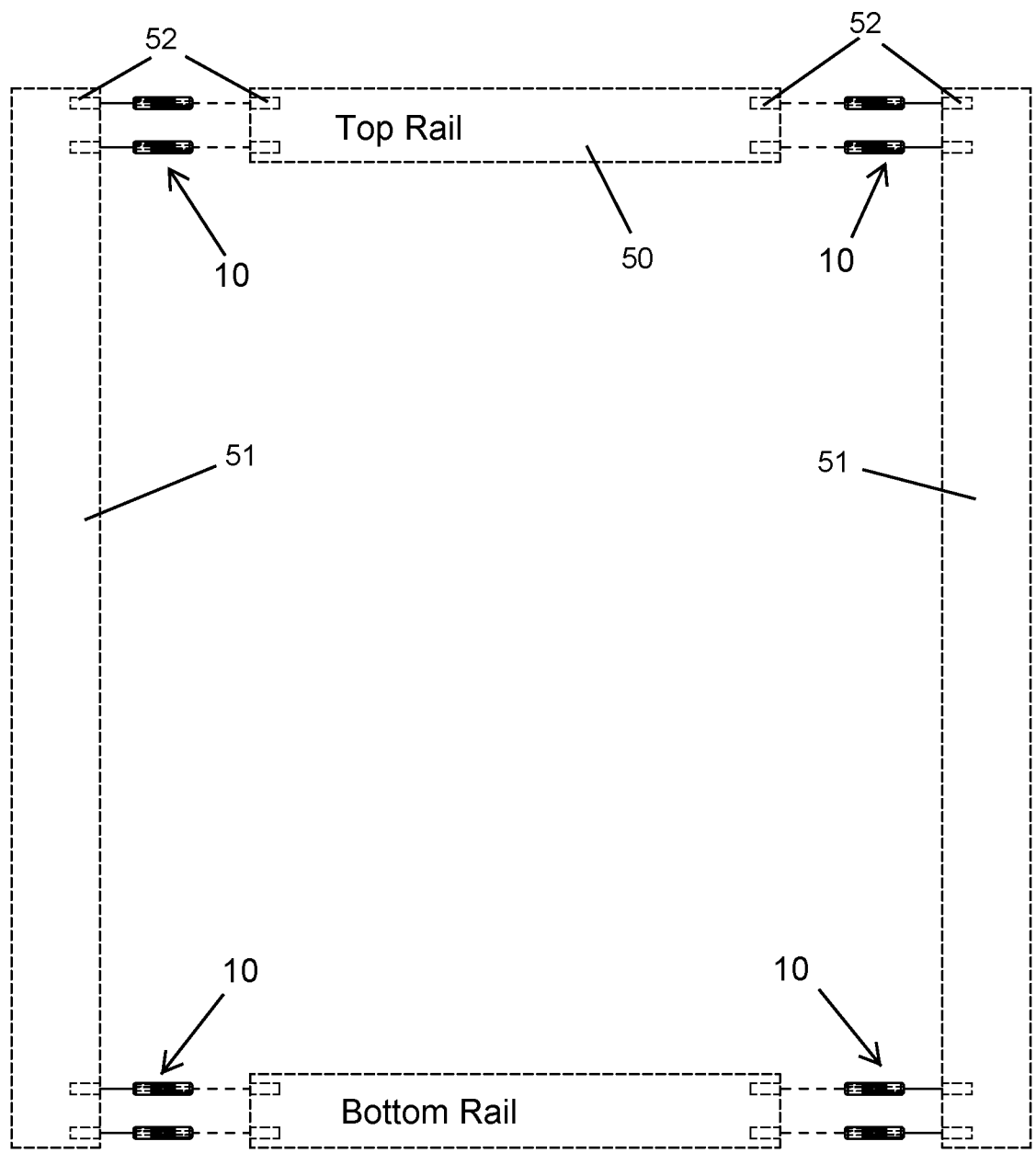
FIG. 7 is an environmental view showing the compressible dowel employed with a cabinet door, in accordance with a non-limiting exemplary embodiment of the present disclosure.
Figure 8:
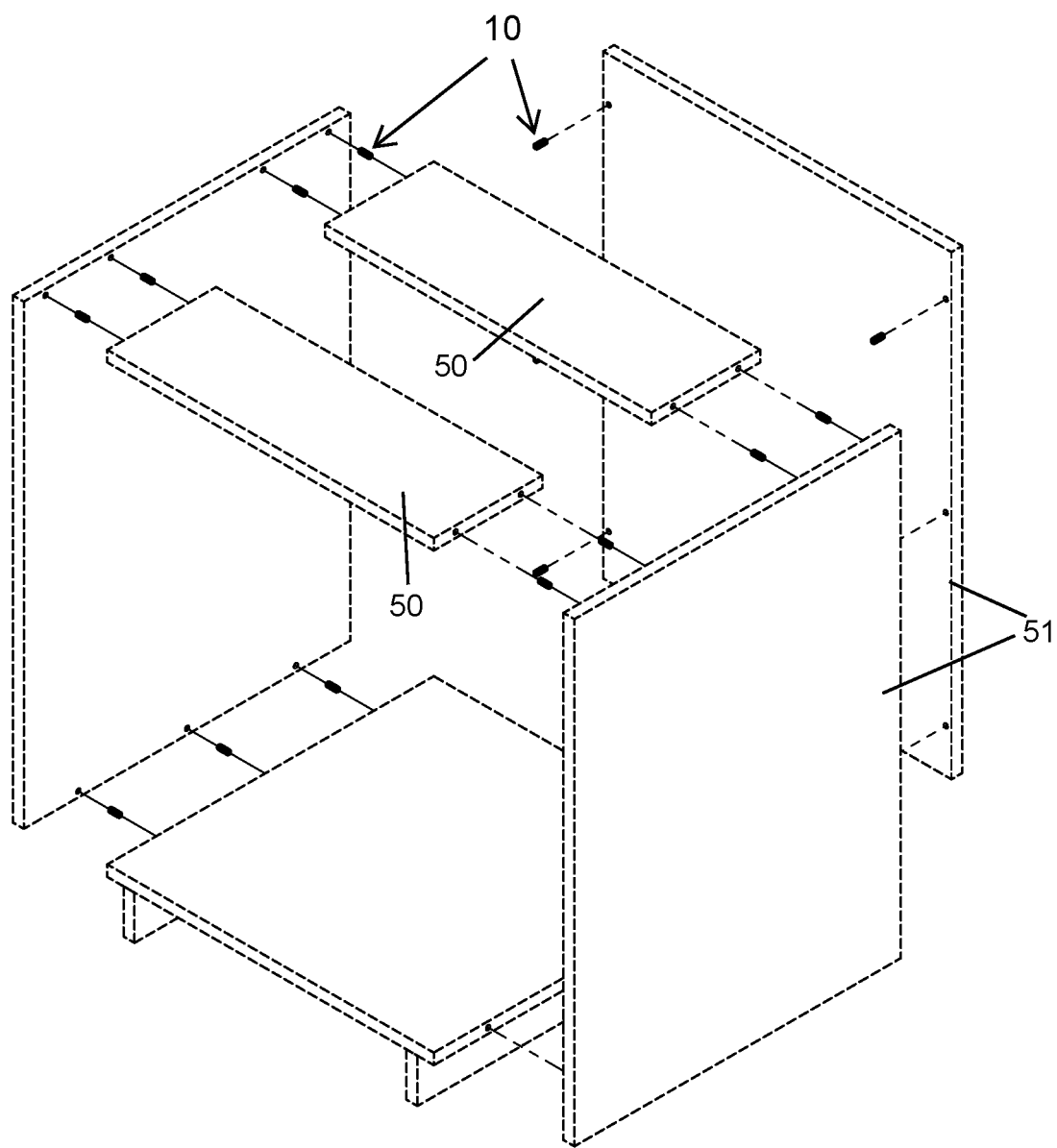
FIG. 8 is an environmental view showing the compressible dowel employed with another door, in accordance with a non-limiting exemplary embodiment of the present disclosure.
Figure 9:
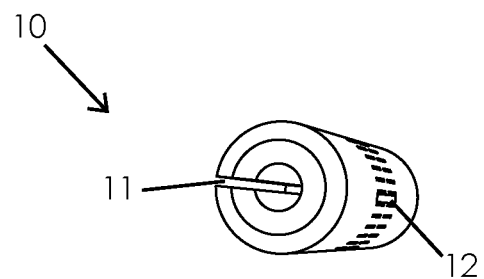
FIG. 9 is another perspective view of the compressible dowel, in accordance with a non-limiting exemplary embodiment of the present disclosure.
Figures 10, 11, 12:
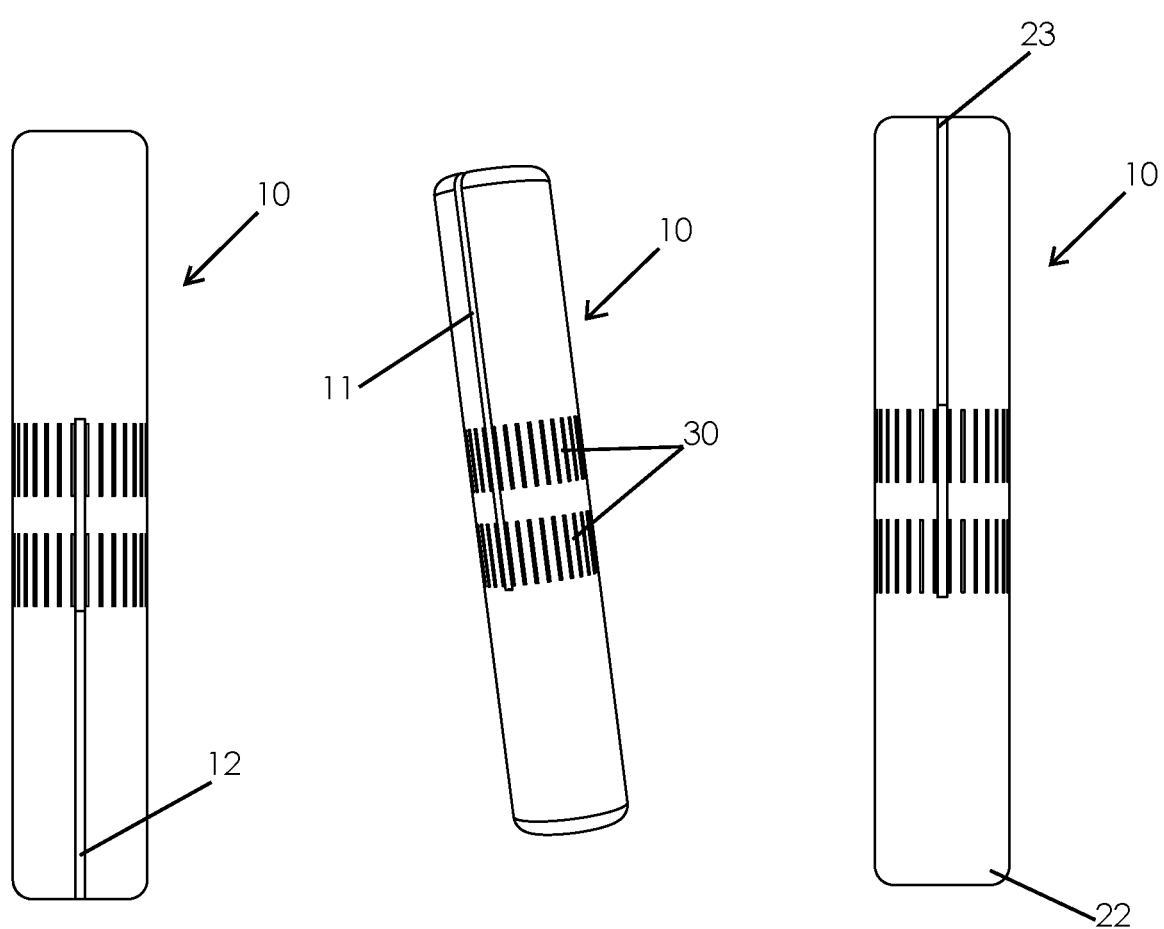
FIG. 10 is a front elevational view of the compressible dowel shown in FIG. 9.
FIG. 11 is another perspective view of the compressible dowel shown in FIG. 9.
FIG. 12 is a rear elevational view of the compressible dowel shown in FIG. 9.

The non-limiting exemplary embodiment(s) is/are referred to generally in FIGS. 1-12 and is/are intended to provide a specially designed compressible compression dowel 10 that is lightweight yet durable in design which has a chemical composition containing polystyrene and a possible glass filling or other material compositions (i.e., NYLON™, polycarbonate, polypropylene), an axial bore 24, a pair of axially-offset linear slots 11, 12, and design-specific ridges 30 on the outer surface 31 for providing improved connectivity between two objects 50, 51 (e.g., doors, windows, cabinets, etc.). It should be understood that the exemplary embodiment(s) may be used to connect a variety of objects and should not be limited to any particular object described herein.

Referring to FIGS. 1-12 general, in a non-limiting exemplary embodiment(s), the compression dowel 10 may be used in the assembly of wooden doors, windows, furniture, cabinets, cabinet doors and musical instruments. The chemical composition of the compression dowel 10 is one of the most important features. It is made of polystyrene and a possible glass filling. Such a composition provides the new and useful benefit of improved strength and durability. The assembly of cabinets, cabinet doors, windows and musical instruments which does not require the compression strength of polystyrene with possible glass can use other specified material compositions (i.e., NYLON™, polycarbonate, polypropylene with no glass content, etc.) with the design specifications of compression dowel 10. Polystyrene may be a synthetic aromatic hydrocarbon polymer made from the monomer known as styrene. Polystyrene can be solid or foamed.

In a non-limiting exemplary embodiment, compression dowel 10 is a replacement for generally used wood dowels in wooden doors, windows, cabinets, cabinet doors and musical instruments, etc. The major diameter of the compression dowel 10 is oversized (0.020 of an inch for a wood door using a four-inch compression dowel 10) for holes 52 drilled into the two mating parts. The purpose is to create a compression and a locational fit. There are dual slots 11, 12 extended along 50% of the compression dowel 10 longitudinal length which allows the compression dowel 10 to compress into the wood hole 52 and be able to exert sufficient holding power in the hole 52.

In a non-limiting exemplary embodiment, slots 11, 12 are located 180 degrees apart to allow the compression dowel 10 to provide compression in several different directions. At the midpoint 37 of the compression dowel 10, there are raised straight (linear) ridges 30 that are between 0.010-0.15 of an inch high from the outer circumference which are used for providing additional holding power at the critical joint of the mating pieces. The axial bore 24 allows for near equal holding strength about the full diameter of the body 20. It also provides a vent for removing air pockets or possible hydraulic pressure. At each end 25, 26 of the compression dowel 10, the radius cuts (edges 22, 23) help guide the compression dowel 10 initially in the drilled hole 52. When the compression dowel 10 is being inserted fully into the drilled hole 52, the chamfered (arcuate) edges 22, 23 will not score the wood walls of the drilled hole 52 nor push forward wood fragments. As noted above, the compression dowel 10 has ridges 30 extending laterally from about the halfway point 37 of its longitudinal length to act as an extra holding force and the ridges 30 are straight so there will be little damage to the interior walls of holes 52. The ridge 30 lengths are small relative to the longitudinal length of the body 20, so as not to cause wall damage along the depth of the hole 52 in the objects 50, 51 being connected.

Conventional manufacturing procedures for assembling wooden doors, windows, cabinets, cabinet doors and musical instruments with wood dowels, use a locational fit. Wood dowels are used to guide the wood sections together. Conventional dowels do not support or hold the door sections together as a joiner. They only guide the door sections into the drill holes 52. The glue on the door section edges is what holds the door together. To begin the existing process, glue is distributed on all of the wood door edge surfaces. Once all the applications of the glue to the door sections have been completed, glue is applied to the wood dowel sized for the drilled hole 52. The wood dowel is then placed in the drill hole 52 and then the door sections are all compressed together. Once the compression is completed, the door is then mechanically clamped together. The door is then sent to dry. Once the glue sections have dried, the clamps for the door are removed and the door is then sent to be cleaned by grit sanding to remove the excess glue from the door surfaces. This process requires many clamps, time delay in getting the wood to dry before beginning the cleanup phase for excess glue removal. Included in this is the time for labor expenses to get the wood door off the assembly line and then put back on. Also included is the cost of the extra clamps, floor storage place and gluing costs.

Further adding to the manufacturing costs, conventional wood dowels must be accurately manufactured in order to provide the proper hold as well as locate the structural mating parts. Some wood dowels are made with spiral or straight grooves to allow the glue to escape from behind the dowel in the blind hole 52. Sometimes if conventional dowels have been sitting in a non-moisture controlled environment, they can swell and if placed in a door's (window's, etc.) drilled hole 52, they may be oversized for the hole 52 and not allow the glue to escape causing a hydraulic pressure problem. Then the door clamps will not be able to close, and this door must be removed. Also, this can happen if too much glue is applied to the dowel or the drilled wood hole 52.

The compression dowel 10 of the present disclosure overcomes such shortcomings. In a non-limiting exemplary embodiment, some advantages of the compression dowel 10 are that it follows the same process to setup the door sections. Advantageously, the difference begins with no need for glue in the dowel holes 52. The compression dowel 10 is placed at the entrance to the drilled hole 52. Once the compression phase begins, the compression dowel 10 surfaces are compressed inside the drilled hole 52 until one-half of the compression dowel 10 is reached. At this point, the door clamps can be removed. The door is now joined by applying glue along the exterior edges of the doors and the glue drying process (along the exterior door edges or mating surfaces) can continue without waiting for the glue to totally dry. The door is now held in place by the compression dowel 10. This compression dowel 10 can be used for any assembly process for windows, cabinets, door components, cabinet doors, furniture and wood chairs, etc.

In a non-limiting exemplary embodiment, because there is no need for glue on the dowel hole 52, this avoids the removal of excess glue that is expunged from the drill hole 52 as the compression dowel 10 is inserted therein during the clamping process. Also, because there is only a thin layer of glue on the door mating surfaces to dry and the clamps can be removed immediately, the sanding process can begin in a short time rather than an overnight delay for the mating surfaces to completely dry before removing the clamps. Because the doors (window, cabinet, etc.) are being held in place by the compression dowel 10, there is no need to keep the clamps on. The doors can be released and sent directly to the sanding process. This results in labor savings because the worker no longer has to remove the door from the work area and put it in storage until the glue dries overnight and the clamps can be released.

In a non-limiting exemplary embodiment, the present disclosure reduces the need for clamping equipment and drying racks. Floor space to store clamping equipment can be recovered for other productive uses. Less glue is needed. Also, this will reduce the hydraulic binding since the compression dowel 10 already has a built-in venting exit feature to allow for air and removal of hydraulic pressure during the clamping process.

In a non-limiting exemplary embodiment, productivity will increase with time savings as production steps are more efficient. A major factor is that the compression dowel 10 can expand and contract with the door, because of the slots 11, 12. Conversely, conventional wood dowels expand and contract with the cycles of humidity in the house, eventually this will leave spacing in the hole 52. Over time, this can cause the door sections to open up and loosen causing gaps in the door. The compression dowel 10 overcomes such shortcomings.

With reference to WO2017160152A1, such subject matter teaches the total encasement of the surface with knurls. Advantageously, there is a cost savings using the compression dowel 10 of the present disclosure due to the reduced quantity of required ridges 30, which will reduce the cost of the mold and the costs per compression dowel 10.

In a non-limiting exemplary embodiment, another major difference is that we use an oversized compression dowel 10 outer diameter 32 relative to the actual drilled wood hole 52 diameter to ensure there is constant radial compression along the entire longitudinal length of the compression dowel 10. This is what causes the compression dowel 10 to hold the wood pieces in place and it is important that the compression dowel 10 walls, beyond the ridges 30, to be smooth for inserting the compression dowel 10 into the drilled hole 52 and also to have a balanced (continuous) compression force along the longitudinal length of the compression dowel 10.

In a non-limiting exemplary embodiment, compression dowel 10 may be one-eighth of an inch shorter in length than the drilled wood hole 52. It is required that the drilled wood hole 52 depth be one-eighth of an inch deeper than half the compression dowel 10 longitudinal length. This will ensure that the compression dowel 10 will not bottom out in the wood hole 52 due to inconsistencies in drilled wood holes 52 being either too short or too long in length due to mechanical problems, (e.g., drill bit wear or improper CNC settings which could affect the compression process). The compression dowel 10 is designed to overcome these problems because of the way compression is applied one side at a time rather than apply full pressure along the entire outer wall across the entire longitudinal length of the compression dowel 10. In this manner, the compression is separated into two sections opposite each other (e.g., equally bifurcated sections along the body 20 of the compression dowel 10).

In a non-limiting exemplary embodiment, another advantage is that compression dowel 10 uses dual slots offset at 180 degrees to each other, starting at about a halfway point 37 of the longitudinal length of the compression dowel 10, to distribute an equal radial compression force equally across the compression dowel 10 and its wood connection sections which makes separating the sections nearly impossible.

In a non-limiting exemplary embodiment, another structural difference is the front and back edges of the WO2017160152A1 reference has a spiral surface end with protrusions, which sole purpose is for roughing the surface of the hole 52. Advantageously, on the compression dowel 10, we have put smooth, chamfered radius cuts to the front and back edges 22, 23 (e.g., proximal end 25 and distal end 26) so the compression dowel 10 can be inserted into the hole 52 without causing wall damage as the compression dowel 10 travels the length of the drilled wood hole 52. The compression dowel ridges 30, and end radius edges 22, 23, displaces wood and do not tear the walls of the hole 52, unlike the WO2017160152A1 reference. At each end 25, 26 of the compression dowel 10, the arcuate (e.g., smooth, chamfered, soft) radius edges 22, 23 help initially guide the compression dowel 10 in the drilled hole 52. When the compression dowel 10 is inserted fully into the drilled hole 52, the chamfered (e.g., smooth, arcuate, soft) edges 22, 23 will not score the wood walls of the drilled hole 52 nor push forward wood fragments.

In a non-limiting exemplary embodiment, the chemical composition of the compression dowel 10 is an important feature. Such a chemical composition may include polystyrene and possible a glass filling or other material compositions (i.e., NYLON™, polycarbonate, polypropylene or suitable material for the application, etc.). This allows for both strength and flexibility when dealing with very hard woods such as oak. Also, on the acetic acid issue with oak and other woods, there are no concerns about the compression connector. First, all oak that is sent from the factories is kiln dried, so most of the acid is removed. If there is minor acetic acid still present in the oak, there would be little chance that it would influence the compression dowel 10 due to the polystyrene composition of the compression dowel 10. Conversely, this would be a concern for conventional wood dowels.

In a non-limiting exemplary embodiment, the compression dowel 10 chemical composition can also be enhanced by adding a layer density or multiple layer densities to the surface of the compression dowel 10. This can be done using a spray technique or encasing the compression dowel 10 in a liquid mixture which will adhere itself to the compression dowel 10 outer surface 31. This will enhance, on a molecular level, the ability of the ridges 30 to attach itself to the walls of any enclosure that it is attached or inserted to while also applying the designed radial pressure of the claim.

In a non-limiting exemplary embodiment, the compression dowel 10 chemical composition may include a polystyrene, which preferably contains no glass. If increased surface hardness is desired, about 10% glass may be added to the chemical composition.

In a non-limiting exemplary embodiment, if increased flexibility is desired, the compression dowel 10 chemical composition may include NYLON™, which is a generic name of polyamide, which is a long-chain fiber-forming polyamides with recurring amide groups. NYLON™ may be a generic designation for a family of synthetic polymers, based on aliphatic or semi-aromatic polyamides.

In a non-limiting exemplary embodiment, the compression dowel 10 chemical composition may include a polycarbonate, which contains about 10% glass for hardness. This is very inflexible and only used in very hard woods (i.e., maple). Polycarbonates are a group of thermoplastic polymers containing carbonate groups in their chemical structures. Polycarbonates used in engineering are strong, tough materials, and may be optically transparent.

In a non-limiting exemplary embodiment, the compression dowel 10 chemical composition may include polypropylene, which contains about 10% glass for adding a little strength, for use with softer woods. Polypropylene, also known as polypropene, is a thermoplastic polymer produced via chain-growth polymerization from the monomer propylene. Polypropylene belongs to the group of polyolefins and is partially crystalline and non-polar. Its properties are like polyethylene, but it is slightly harder and more heat resistant. It is a white, mechanically rugged material and has a high chemical resistance.

In a non-limiting exemplary embodiment, compression dowel 10 was designed to allow connection between smaller wood sections that are three-sixteenth of an inch in diameter and three-quarters inch long to account for cabinet doors and cabinet bodies. Because of these small holes 52 and their thin size requirements, it is preferable to have smooth drilled wood holes 52 with a smooth compression dowel 10 exerting pressure rather than using a process that will leave serrated walls, which might cause wood splits in the drilled hole 52 and open up the connection over a period of time.

In a non-limiting exemplary embodiment, compression dowel 10 uses compression to join objects 50, 51 (e.g., doors, cabinets, windows, etc.) together. It was specially designed to work with wood. The compression dowel 10 is under extreme pressure in the drilled hole 52. This is why it joins wood together and cannot be separated once applied. It reduces time spent on gluing, waiting for glue to dry and reduced glue costs and also the amount of glue labor costs incurred in the drying process. In furniture building, many clamps are needed to be applied in order to build a table, chair, stool, window cabinet, etc. With compression dowel 10, just put body 20 in the drill hole 52 and clamp it down. Then release and go onto the other sections. There is no need to deposit glue inside the hole 52 of the cabinet door, for example.

In a non-limiting exemplary embodiment, compressible compression dowel 10 uses radial compression in the drilled hole 52 to specifically locate and join parts together. Compression dowel 10 was designed to work with wood sections. Once the compression dowel 10 is inserted into the drilled hole 52, it instantaneously applies radial compression to the drilled wood walls in the hole 52 and creates a bonding force with the smooth walls. It was designed to work on wood. Since glue is not desired in the compression dowel holes 52, it reduces labor time spent on gluing, waiting for glue to dry and labor costs, sanding excess glue from the compression dowel 10 joints, and costs incurred in the drying process. It also reduces the floor costs for storage areas for the clamped doors waiting for the glue to dry. This process can last from tree to twelve hours or longer depending on the atmospheric humidity and the wood moisture content. In furniture building, many clamps need to be applied in order to build many different types of furniture. With the compression dowel 10, just put the compression dowel 10 in the drill hole 52 and clamp it down, and apply glue on the mating wood surfaces. No need to put glue in the wood holes 52. Advantageously, the clamps may be removed after only minutes to allow the glue to set.

In a non-limiting exemplary embodiment, compression dowel 10 advantageously includes a body 20 including polystyrene and possible glass filling composition or other material compositions (i.e., NYLON™, polycarbonate, polypropylene or suitable material for the application, etc.) for wood doors. Such a body 20 further has a centrally registered longitudinal axis 21 and includes curved, smooth, chamfered end radii at each end 22, 23 and has an axial bore 24 extended along an entire longitudinal length of the centrally registered longitudinal axis 21. The body 20 further includes a first slot 11 beginning from a proximal end 25 of the body 20 and terminating at the midpoint 37 of the longitudinal length of the body 20. A second slot 12 begins from a distal end 26 of the body 20 and terminates at the midpoint 37 of the longitudinal length of the body 20. Each slot 11, 12 has a terminating closed end point provided with a curved, arcuate radius suitably sized and for allowing compression of the body 20.

In a non-limiting exemplary embodiment, the body 20 further includes a collapsible outer diameter 32 that exerts full diameter pressure even as the moisture changes.

In a non-limiting exemplary embodiment, the first slot 11 is approximately 180 degrees axially offset from the second slot 12.

In a non-limiting exemplary embodiment, the body 20 further includes a plurality of ridges 30 arranged in a linear pattern 39, which is circumscribed about the outer surface 31 and disposed adjacent to the midpoint 37 of the longitudinal length of the body 20.

In a non-limiting exemplary embodiment, each of the proximal end 25 and the distal end 26 of the body 20 has an outermost chamfered, smooth, arcuate, or soft shoulder (leading edge) provided with a radius of curvature suitably sized and shaped for guiding the body 20 initially in a drilled hole 52 of an object. No sharp edges or ninety-degree edges are located at the proximal end 25 and the distal end 26 of the body 20.

In a non-limiting exemplary embodiment, a compression dowel 10 used for wooden doors and furniture is disclosed wherein the compression dowel 10 composition is made of polystyrene and possible glass filling or other material compositions (i.e., NYLON™, polycarbonate, polypropylene or suitable material for the application, etc.). The major outer diameter 32 of the compression dowel 10 is oversized for the holes 52 drilled into the mating parts. Two slots 11, 12 are disposed along about fifty percent of the compression dowel 10 longitudinal length, which allows the compression dowel 10 to collapse to fit the hole 52 and be able to exert sufficient holding power in the hole 52 through compression. The compression dowel 10 slots are located 180 degrees apart to allow the compression dowel 10 to provide compression in several different directions (about separate longitudinal axes offset from each other). From about the midpoint 37 of the compression dowel 10, raised straight ridges 30 are laterally extended between approximately 0.010-0.015 of one inch high on the outer circumference of body 20. These linear ridges 30 have a leading and trailing slope at about a forty-five degree angle so as not to damage the drilled hole 52 in the wood walls of the wood. They were designed to be located opposite the axial slots 11, 12 so as not to interfere when the ends 25, 26 during radial compression when placed in the drill hole 52. There may be 10 linear ridges 30, which are specially designed and positioned in a pattern circling around the compression dowel 10 outer surface 31, which are used for providing additional holding power at the critical joint of the mating pieces. The axial bore 24 provides a vent for removing air pockets and preventing possible buildup of air pressure during the assembly phase and also provides the outward spring tension. All edges 22, 23 have a smooth, soft arcuate radius so as to not cut into the wood hole 52.

In a non-limiting exemplary embodiment, the first slot 11 is located at a first quadrant 58 of a first half of the body 20 and the second slot 12 is located at a second quadrant 59 of a second half of the body 20. The first quadrant 58 (and first slot 11) is axially offset, non-overlapping, an mutually exclusive of the second quadrant 59 (and second slot 12).

In a non-limiting exemplary embodiment, at each end of the compression dowel 10, the smooth, arcuate, chamfered, soft radius cuts (shoulder) 22, 23 of the sized chamber are used to guide the compression dowel 10 initially in the drilled hole 52. When the compression dowel 10 is being inserted fully into the drilled hole 52, the compression dowel 10 leading edges 22, 23 (chamfered proximal end 25 and chamfered distal end 26) will not score the walls of the drilled hole 52 nor push forward wood fragments.

In a non-limiting exemplary embodiment, the compression dowel 10 includes a body 20 having a centrally registered longitudinal axis 21 and including a hollow chamber 64 having an axial bore 24 extended along an entire longitudinal length of the centrally registered longitudinal axis 21, a first slot 11 beginning from a proximal end 25 of the body 20 and terminating at approximately a midpoint 37 of the longitudinal length of the body 20, and a second slot 12 beginning from a distal end 26 of the body 20 and terminating at approximately the midpoint 37 of the longitudinal length of the body 20. Advantageously, each of the first slot 11 and the second slot 12 are linear and extended along mutually exclusive and non-overlapping portions (quadrants 58, 59) of the body 20.

In a non-limiting exemplary embodiment, the body 20 further includes a plurality of linear ridges 30 arranged in a juxtaposed linear pattern 39 circumscribed about the outer surface 31 and disposed adjacent to the midpoint 37 of the longitudinal length of the body 20.

The present disclosure further includes a method of utilizing a compression dowel 10 for locating two objects 50, 51 (e.g., doors, cabinets, windows, etc.) together. Such a method includes the steps of: providing a body 20 having a centrally registered longitudinal axis 21 and including a hollow chamber 64 having an axial bore 24 extended along an entire longitudinal length of the centrally registered longitudinal axis 21, a first slot 11 beginning from a proximal end 25 of the body 20 and terminating at approximately a midpoint 37 of the longitudinal length of the body 20, and a second slot 12 beginning from a distal end 26 of the body 20 and terminating at approximately the midpoint 37 of the longitudinal length of the body 20, wherein each of the first slot 11 and the second slot 12 are linear and extended along mutually exclusive and non-overlapping portions (quadrants 58, 59) of the body 20; providing a first object having a first hole 52; providing a second object having a second hole 52; without depositing glue into the first hole 52, inserting a first half of the body 20 into the first hole 52; without depositing glue into the second hole 52, inserting a second half of the body 20 into the second hole 52; and abutting the first object to the second object.

In a non-limiting exemplary embodiment, the compression dowel 10 is a replacement for generally used conventional wood dowels used in existing wooden doors, windows, cabinets, cabinet doors, furniture and musical instruments.

In a non-limiting exemplary embodiment, the major (outer) diameter 32 of the compression dowel 10 is oversized (e.g., approximately 0.020 of an inch for a wood door using a four-inch longitudinal length polystyrene compression dowel 10 with possible glass filling or other material compositions (i.e., NYLON™, polycarbonate, polypropylene or other suitable material) for the holes 52 drilled into the two mating parts of the wood doors, for example. The purpose is to create a frictional interference fit of applied compression versus a locational fit such as an existing wood dowel which provides no compression. There are various other diameters and lengths to meet the various requirements of wood joinery with and without ridges 30.

In a non-limiting exemplary embodiment, there are dual slots extended along about fifty percent of the compression dowel 10 longitudinal length, which allows the compression dowel 10 to compress to fit the hole 52 and be able to exert sufficient holding power in the hole 52 through compression. Such dowel slots 11, 12 are located 180 degrees apart to allow the compression dowel 10 to provide compression in several circular directions.

In a non-limiting exemplary embodiment, at approximately the midpoint 37 of the compression dowel 10, there are raised straight (linear) ridges 30. There are two sets of five ridges 30 centrally located laterally away from a midpoint 37 of the body 20. The two slots 11, 12 are offset approximately ninety degrees from each other. The height of the ridges 30 may be approximately 0.010-0.015 of one inch high on the outer circumference which are specifically designed for providing additional holding power at the critical joint of the mating pieces. Such ridges 30 may be oriented along a linear juxtaposed pattern, which is circumscribed along the outer surface 31 of the compression dowel 10 and cover approximately forty percent of a longitudinal length of the compression dowel 10. Such a length of the ridges 30 is important so it does not negatively affect the compression of body 20 along slots 11, 12.

In a non-limiting exemplary embodiment, the axial bore 24 allows for near equal holding strength about the full diameter of the body 20. It also provides a vent for removing air pockets or possible hydraulic air pressure from the compression phase while being inserted into cabinet hole 52, for example.

In a non-limiting exemplary embodiment, compression dowel 10 follows the same process as for set up of the door sections. The difference begins with there is to be no glue in the cabinet holes 52. The compression dowel 10 is then placed at the entrance to the drill hole 52. Once the compression phase begins, the dowel ends 25, 26 are compressed inside the drilled hole 52 until one-half of the compression dowel 10 is reached. At this point, the door sections should be completely sealed. The door clamps can be removed. The door is now joined. The door is held in place by the compression dowel 10. This compression dowel 10 can be used for any assembly process for windows, cabinets, door components, cabinet doors, furniture and wood instruments.

In a non-limiting exemplary embodiment, because the objects 51, 52 (e.g., door, window, cabinet, etc.) are being held in place by the compression dowel 10, there is no need to keep the clamps on beyond the initial glue set time. The door can be released and sent directly to the sanding process. This results in savings of labor because the worker no longer has to remove the door from the assembly and put the door in storage until the glue dries.

This will reduce the need for long term clamping equipment and also drying racks. Floor space to store clamping equipment can be recovered for other productive uses. Less glue is needed. Also, this will also reduce the hydraulic binding since the compression dowel 10 already has a built-in air vent. Productivity will increase with time savings. Since there is no glue needed in the compression dowel 10 and the cabinet hole 52, this will reduce the sanding time needed for the door. This is a labor savings and also a cost savings on the wear and tear of the sanding paper and machine life.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A dowel for locating two objects together, said dowel comprising: a body having an outer surface and a centrally registered longitudinal axis and including a chamber having an axial bore extended along an entire longitudinal length of the centrally registered longitudinal axis;
   a first slot beginning from a proximal end of said body and terminating at approximately a midpoint of the longitudinal length of the body; and
   a second slot beginning from a distal end of said body and terminating at approximately the midpoint of the longitudinal length of the body;
   a plurality of ridges circumscribed about said outer surface of said body and disposed adjacent to the midpoint of the longitudinal length of said body;
   wherein an entire longitudinal length of said first slot and said second slot, respectively, is rectilinear;

wherein each of said first slot and said second slot is parallel to said plurality of ridges;

wherein each of said proximal end and said distal end of said body has an outermost shoulder provided with a radius of curvature suitably sized and shaped for guiding said body initially in a drilled hole of an object;

wherein said outer most shoulder of said proximal end and said distal end each has a continuous and uninterrupted circumferential length provided with a first end and a second end beginning and terminating at said second slot and said first slot, respectively.

2. The dowel of claim 1, wherein said body further comprises: a collapsible outer diameter.

3. The dowel of claim 1, wherein said first slot is approximately 180 degrees axially offset from said second slot.

4. The dowel of claim 1, wherein said body comprises a chemical composition including a polycarbonate.

5. The dowel of claim 1, wherein said body comprises a chemical composition including a polyethylene.

6. The dowel of claim 1, wherein said body comprises a chemical composition including 10% glass.

7. A dowel for locating two objects together, said dowel comprising: a body having an outer surface and a centrally registered longitudinal axis and including a hollow chamber having an axial bore extended along an entire longitudinal length of the centrally registered longitudinal axis;

a first slot beginning from a proximal end of said body and terminating at approximately a midpoint of the longitudinal length of the body; and a second slot beginning from a distal end of said body and terminating at approximately the midpoint of the longitudinal length of the body;

wherein each of said first slot and said second slot are linear and extended along mutually exclusive and non-overlapping portions of said body;

a plurality of ridges circumscribed about said outer surface and disposed adjacent to the midpoint of the longitudinal length of said body;

wherein an entire longitudinal length of said first slot and said second slot, respectively, is rectilinear;

wherein each of said first slot and said second slot is substantially parallel to said plurality of ridges;

wherein each of said proximal end and said distal end of said body has an outermost shoulder provided with a radius of curvature suitably sized and shaped for guiding said body initially in a drilled hole of an object;

wherein said outer most shoulder of said proximal end and said distal end each has a continuous and uninterrupted circumferential length provided with a first end and a second end beginning and terminating at said second slot and said first slot, respectively.

8. The dowel of claim 7, wherein said body further comprises: a collapsible outer diameter.

9. The dowel of claim 8, wherein said first slot is approximately 180 degrees axially offset from said second slot.

10. The dowel of claim 7, wherein said body comprises a chemical composition including a polycarbonate.

11. The dowel of claim 10, wherein said body comprises a chemical composition including a polyethylene.

12. The dowel of claim 11, wherein said body comprises a chemical composition including 10% glass.

13. A method of utilizing a dowel for locating two objects together, said method comprising the steps of:

providing a body having a centrally registered longitudinal axis and including a hollow chamber having an axial bore extended along an entire longitudinal length of the centrally registered longitudinal axis, a first slot beginning from a proximal end of said body and terminating at approximately a midpoint of the longitudinal length of the body, and a second slot beginning from a distal end of said body and terminating at approximately the midpoint of the longitudinal length of the body, wherein each of said first slot and said second slot are linear and extended along mutually exclusive and non-overlapping portions of said body;

providing a first object having a first hole;

providing a second object having a second hole;

without depositing glue into said first hole, inserting a first half of said body into said first hole;

without depositing glue into said second hole, inserting a second half of said body into said second hole; and abutting said first object to said second object.

* * * * *